United States Patent
Konishi et al.

(10) Patent No.: US 11,126,191 B2
(45) Date of Patent: Sep. 21, 2021

(54) CONTROL DEVICE AND CONTROL METHOD

(71) Applicant: Panasonic Intellectual Property Corporation of America, Torrance, CA (US)

(72) Inventors: Kazunobu Konishi, Osaka (JP); Shuhei Matsui, Osaka (JP); Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 159 days.

(21) Appl. No.: 16/042,102

(22) Filed: Jul. 23, 2018

(65) Prior Publication Data

US 2019/0041864 A1 Feb. 7, 2019

(30) Foreign Application Priority Data

Aug. 7, 2017 (JP) .............................. JP2017-152637
Feb. 26, 2018 (JP) .............................. JP2018-031627

(51) Int. Cl.
*G05D 1/02* (2020.01)
*H04W 4/44* (2018.01)
(Continued)

(52) U.S. Cl.
CPC ......... *G05D 1/0225* (2013.01); *G05D 1/0246* (2013.01); *G06Q 10/08* (2013.01);
(Continued)

(58) Field of Classification Search
USPC .......................................................... 701/23
See application file for complete search history.

(56) References Cited

U.S. PATENT DOCUMENTS 5,046,022 A * 9/1991 Conway ............... G05B 19/427
  700/250
5,680,313 A * 10/1997 Whittaker .............. G05D 1/024
  701/300

(Continued)

FOREIGN PATENT DOCUMENTS

CN 105383377 A 3/2016
JP 2006-250874 9/2006
(Continued)

OTHER PUBLICATIONS

The Extended European Search Report from the European Patent Office (EPO) dated Nov. 30, 2018 for the related European Patent Application No. 18186983.5.

(Continued)

*Primary Examiner* — Jean Paul Cass
(74) *Attorney, Agent, or Firm* — Greenblum & Bernstein, P.L.C.

(57) ABSTRACT

Various embodiments for controlling a state of an autonomous vehicle that is to meet a user are provided. A receiver receives location information indicating a current location of the user. A memory stores a plurality of states of the autonomous vehicle. Each of the states at least one of visually or audibly distinguishes the autonomous vehicle. A sensor senses an environment of the autonomous vehicle to obtain environment information. A distance from a place of meeting the user to the current location of the user is calculated based on the location information. A first state is selected in accordance with the environment information. The autonomous vehicle is caused to change from a second state to the first state when the distance from the place of meeting the user to the current location of the user becomes smaller than or equal to a predetermined distance.

21 Claims, 6 Drawing Sheets

(51) Int. Cl.
*G06Q 10/08* (2012.01)
*G06Q 50/28* (2012.01)

(52) U.S. Cl.
CPC ......... *G06Q 10/0832* (2013.01); *G06Q 50/28* (2013.01); *H04W 4/44* (2018.02)

(56) References Cited

U.S. PATENT DOCUMENTS

| | | | | |
|---|---|---|---|---|
| 6,975,247 | B2* | 12/2005 | Kimmet | B64D 45/0015 340/945 |
| 8,475,050 | B2* | 7/2013 | Eswara | G06T 7/174 384/164 |
| 8,849,494 | B1* | 9/2014 | Herbach | B60W 60/0015 701/24 |
| 9,405,293 | B2* | 8/2016 | Meuleau | B62D 15/025 |
| 10,217,297 | B2* | 2/2019 | DeCia | H04N 5/23241 |
| 10,223,844 | B1* | 3/2019 | Schwie | G07C 5/008 |
| 10,240,938 | B1* | 3/2019 | Wengreen | G01C 21/3423 |
| 10,268,192 | B1* | 4/2019 | Wengreen | G06Q 50/30 |
| 10,328,769 | B2* | 6/2019 | Ferguson | G05D 1/0214 |
| 10,331,124 | B2* | 6/2019 | Ferguson | G06K 9/00812 |
| 10,361,802 | B1* | 7/2019 | Hoffberg-Borghesani | G11B 27/11 |
| 2008/0228680 | A1* | 9/2008 | Chen | G06N 3/0454 706/21 |
| 2013/0210342 | A1 | 8/2013 | Tanaka et al. | |
| 2013/0317693 | A1 | 11/2013 | Jefferies et al. | |
| 2015/0006005 | A1 | 1/2015 | Yu et al. | |
| 2015/0346727 | A1 | 12/2015 | Ramanujam | |
| 2016/0099927 | A1 | 4/2016 | Oz et al. | |
| 2016/0171637 | A1 | 6/2016 | Rai | |
| 2017/0088038 | A1* | 3/2017 | Geller | B60Q 1/50 |
| 2017/0120804 | A1 | 5/2017 | Kentley et al. | |
| 2017/0123421 | A1 | 5/2017 | Kentley et al. | |
| 2017/0123423 | A1* | 5/2017 | Sako | G06Q 30/0645 |
| 2017/0316533 | A1* | 11/2017 | Goldman-Shenhar | G06Q 50/30 |
| 2018/0234446 | A1* | 8/2018 | Conner | H04W 12/122 |
| 2018/0373980 | A1* | 12/2018 | Huval | G06K 9/00805 |
| 2019/0004539 | A1* | 1/2019 | Yu | G06Q 10/08 |
| 2019/0310634 | A1* | 10/2019 | Hazard | G06N 5/04 |
| 2019/0310635 | A1* | 10/2019 | Hazard | G06F 17/18 |
| 2019/0339709 | A1* | 11/2019 | Tay | G05D 1/0088 |

FOREIGN PATENT DOCUMENTS

| | | |
|---|---|---|
| JP | 2015/191264 A | 11/2015 |
| JP | 2016-201008 | 12/2016 |
| WO | 2010/051510 A2 | 5/2010 |
| WO | 2010/144490 A1 | 12/2010 |

OTHER PUBLICATIONS

Communication pursuant to Article 94(3) EPC from European Patent Office (EPO) dated Sep. 9, 2019 for the related European Patent Application No. 18186983.5.

* cited by examiner

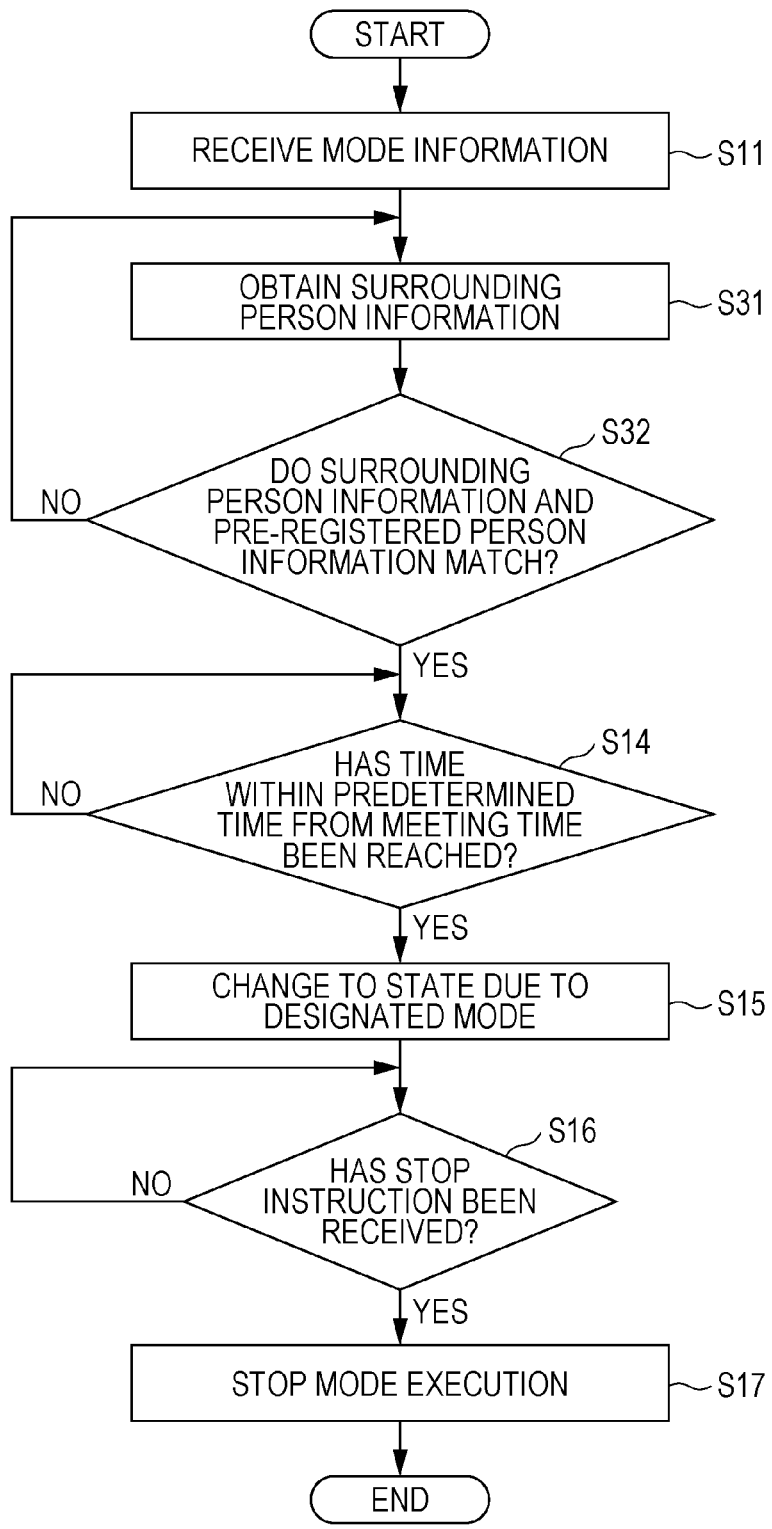

CONTROL DEVICE AND CONTROL METHOD

BACKGROUND

1. Technical Field

The present disclosure relates to a control device and a control method for controlling the state of an autonomous vehicle that is to meet a user.

2. Description of the Related Art

In recent years, technology for autonomous vehicles has been developed, and package delivery using such autonomous vehicles as self-driving delivery vehicles has been conceived and is undergoing experiment for practical application. Such self-driving delivery vehicles need to meet users in order to deliver packages thereto. Also, a vehicle-dispatching method using an autonomous driving automobile as a vehicle to be dispatched has also been proposed, in which case, it is also necessary to meet a user in order for the user to get in the autonomous driving automobile.

With respect to such meeting between a user and a vehicle, for example, Japanese Unexamined Patent Application Publication No. 2016-201008 discloses a technology in which a vehicular terminal device installed in a vehicle has a notifying unit that notifies an occupant of the vehicle by displaying information on a screen of a car navigation system, and the location of a pedestrian is displayed on a map on the car navigation system when vehicle-waiting information transmitted from a pedestrian terminal device is received. In this case, it is possible to accurately know the location of the pedestrian who is waiting for the vehicle, so that the vehicle can efficiently arrive at a meeting place. Also, Japanese Unexamined Patent Application Publication No. 2016-201008 also discloses a technique in which, when the pedestrian possesses a light-emitting diode (LED) illuminator, and the pedestrian terminal device transmits pedestrian information including meeting information, the LED illuminator is caused to blink. In this case, the driver of the vehicle can easily find the pedestrian he or she is to meet, thus making it possible to improve convenience in meeting between the pedestrian and the vehicle.

Japanese Unexamined Patent Application Publication No. 2006-250874 discloses a technology in which guidance information indicating a relative entry direction of a vehicle viewed from a meeting place is transmitted from the vehicle to a mobile phone device of a person who is to meet. To this end, based on location information indicating a meeting place set in a guidance route memory as a destination and route information indicating a route to the meeting place, a guidance generator generates voice guidance information indicating from which direction the vehicle enters the meeting place, and the generated guidance information is transmitted from a communication interface to the mobile phone device of the person who is to meet via a mobile phone device. In this case, the person who is to meet can easily check the vehicle that is heading for the meeting place.

SUMMARY

In the related technologies described above, although meeting between a vehicle driven by a driver and a user has been discussed, no consideration has been given to meeting between an autonomous vehicle and a user, thus requiring a further improvement in the method for meeting between an autonomous vehicle and a user.

One non-limiting and exemplary embodiment provides a control device and a control method that can identify an autonomous vehicle that a user is to meet, when the autonomous vehicle and the user are to meet.

In one general aspect, the techniques disclosed here feature a control device for controlling a state of an autonomous vehicle that is to meet a user. The control device includes: a receiver that receives location information indicating a current location of the user; a memory that stores a plurality of states of the autonomous vehicle, each of the plurality of states being a state in which the autonomous vehicle is at least one of visually or audibly distinguished; a sensor that senses a surrounding environment of the autonomous vehicle to obtain environment information; and a processor. In operation, the processor performs operations including: calculating a distance from a place of meeting the user to the current location of the user, based on the location information; selecting a first state from the plurality of states in accordance with the environment information; and causing the autonomous vehicle to change from a second state to the first state when the distance from the place of meeting the user to the current location of the user becomes smaller than or equal to a predetermined distance.

According to the present disclosure, when an autonomous vehicle and a user are to meet, the user can easily identify the autonomous vehicle and can reliably meet up with the autonomous vehicle without confusion.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a flowchart illustrating one example of state control processing performed by the self-driving delivery vehicle illustrated in FIG. 5.

DETAILED DESCRIPTION (Knowledge Underlying Present Disclosure)

Figure 1:
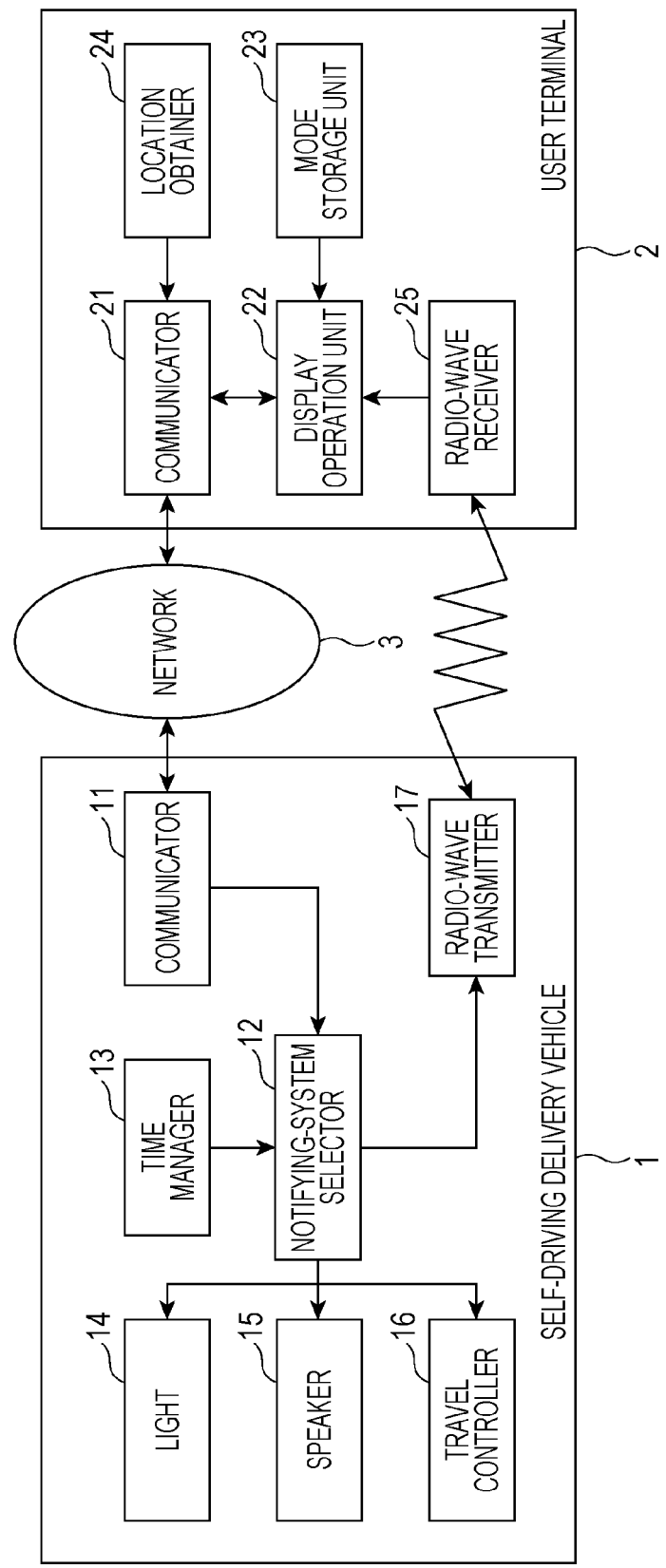
FIG. 1 is a block diagram illustrating one example of the configuration of a vehicle-location notifying system in a first embodiment of the present disclosure.

As described above, although, in the meeting methods in the related technologies, meeting between a general vehicle driven by a driver and a user has been considered, no consideration has been given to meeting between an autonomous vehicle and a user. For example, when a self-driving delivery vehicle, which travels by autonomous driving to deliver a package to a user, is used as an autonomous vehicle, adequate space is required in order for the user to receive the package, and the self-driving delivery vehicle needs to be parked for a predetermined amount of time.

Using a parking lot as a place that satisfies such requirements is conceivable. However, when a large number of other vehicles is parked in the parking lot, or the external appearance of the self-driving delivery vehicle is similar to another vehicle, the user cannot easily recognize the self-driving delivery vehicle.

Also, in an indoor parking lot or an underground parking lot, it is difficult to receive radio waves from satellites, and thus there are cases in which detailed location information of the self-driving delivery vehicle cannot be obtained using a global positioning system (GPS).

In order to overcome the above-described problems, the present inventors made intensive and extensive studies on how to make a user easily recognize the autonomous vehicle in various parking lots including a parking lot where the location information of the autonomous vehicle cannot be obtained, which lead to the present disclosure.

A control device according to one aspect of the present disclosure is directed to a control device for controlling a state of an autonomous vehicle that is to meet a user. The control device includes: a receiver that receives location information indicating a current location of the user; a memory that stores a plurality of states of the autonomous vehicle, each of the plurality of states being a state in which the autonomous vehicle is at least one of visually or audibly distinguished; a sensor that senses a surrounding environment of the autonomous vehicle to obtain environment information; and a processor. In operation, the processor performs operations including: calculating a distance from a place of meeting the user to the current location of the user, based on the location information; selecting a first state from the plurality of states in accordance with the environment information; and causing the autonomous vehicle to change from a second state to the first state when the distance from the place of meeting the user to the current location of the user becomes smaller than or equal to a predetermined distance.

A control device having this configuration receives the location information indicating the current location of a user and calculates the distance from a place of meeting the user to the user, based on the received location information. When the calculated distance to the user becomes smaller than or equal to the predetermined distance, the control device causes the autonomous vehicle to change from the second state to the first state in which the autonomous vehicle is at least one of visually or audibly distinguished. Accordingly, even when the autonomous vehicle is to meet a user in a parking lot where the location information of the autonomous vehicle cannot be obtained, the current location of the user can be obtained to thereby determine the distance from the parking lot to the user, that is, the distance from the autonomous vehicle to the user, and when the user comes close to the autonomous vehicle, the state of the autonomous vehicle can be changed to a state that can be recognized by the user. As a result, when the autonomous vehicle and a user are to meet, the user can easily identify the autonomous vehicle and can reliably meet up with the autonomous vehicle without confusion. Further, the control device selects a first state from the plurality of states in accordance with the environment information, and causes the autonomous vehicle to change from a second state to the first state when the calculated distance to the user becomes smaller than or equal to the predetermined distance. Accordingly, the state of the self-driving delivery vehicle can be changed to a state that suits the surrounding environment. Thus, the user can reliably recognize the autonomous vehicle that he or she is to meet.

In the control device, the operations may further include: determining that a current time is within a predetermined time from a time of meeting the user; and causing the autonomous vehicle to change from the second state to the first state, when the distance from the place of meeting the user to the current location of the user becomes smaller than or equal to the predetermined distance, and the current time is within the predetermined time from the time of meeting the user.

A control device having this configuration detects that the current time is within a predetermined time from the time of meeting the user, and when the distance to the user becomes smaller than or equal to the predetermined distance, and the current time reaches a time within the predetermined time from the time of meeting the user, the control device causes the autonomous vehicle to change from the second state to the first state. Thus, even in a case in which the autonomous vehicle is to meet a user in a parking lot where the location information of the autonomous vehicle cannot be obtained, when the user comes close to the autonomous vehicle, and the current time reaches a time close to the meeting time, the state of the autonomous vehicle can be changed to a state that is recognizable by the user, and it is possible to prevent issuing a notification at an erroneous timing.

In the control device, the operations may further include: receiving, via the receiver, the first state designated by the user.

A control device having this configuration receives the first state designated by the user. Thus, when the user comes close to the autonomous vehicle, the state of the autonomous vehicle can be changed to the state designated by the user, so that the user can easily recognize the autonomous vehicle that he or she is to meet.

The plurality of states includes at least one of a state in which a light of the autonomous vehicle enters a predetermined turn-on state, a state in which the autonomous vehicle generates a predetermined sound, a state in which the autonomous vehicle moves forward or backward a predetermined distance, a state in which the autonomous vehicle generates a predetermined radio wave that is receivable by a terminal device possessed by the user, a state in which a door of the autonomous vehicle is opened and closed, a state in which a display on a side-surface display of the autonomous vehicle is changed, a state in which the autonomous vehicle is visually distinguished with projection mapping, and a state in which a blinker of the autonomous vehicle enters a blinking state.

With respect to the state designated by the user, a control device having this configuration causes a light to enter a predetermined turn-on state, causes a predetermined sound to be generated, causes the autonomous vehicle to move forward or backward a predetermined distance, causes a predetermined radio wave receivable by a terminal device possessed by the user to be generated, causes a door to be opened and closed, causes a display on a side-surface display to be changed, makes the autonomous vehicle recognizable by projection mapping, or causes a blinker to enter a blinking state. Thus, the user can reliably recognize the autonomous vehicle that he or she is to meet.

Amongst the plurality of states, notifiers for making the autonomous vehicle at least one of visually or audibly distinguished to the user differ.

A control device having this configuration selects the first state in which the notifier differs. Thus, the state of the autonomous vehicle can be switched to a state using the notifier that suits the surrounding situation.

In the control device, the environment information may include surrounding person information regarding a person who is in the surrounding environment of the autonomous vehicle. In addition, the operations may further include: determining whether the surrounding person information and pre-registered person information match; and causing the autonomous vehicle to change from the second state to the first state, when it is determined that the surrounding person information and the pre-registered person information match.

A control device having this configuration obtains surrounding person information, determines whether the obtained surrounding person information and pre-registered person information match, and causes the autonomous vehicle to change from the second state to the first state when the surrounding person information and the pre-registered person information match. Thus, when the user is a pre-registered person, the user can easily identify the autonomous vehicle and can reliably meet up with the autonomous vehicle without confusion.

The autonomous vehicle may be a self-driving delivery vehicle that delivers a package to the user by autonomous driving, and the place of meeting the user may be a parking lot where the package is delivered to the user.

An autonomous vehicle controlled by a control device having this configuration is a self-driving delivery vehicle that delivers a package of a user by autonomous driving and that delivers the package to the user in a parking lot that is a place of meeting the user. Thus, even when the self-driving delivery vehicle is to meet a user in a parking lot where the location information of the self-driving delivery vehicle cannot be obtained, the user can easily identify the autonomous vehicle and can receive a package from the self-driving delivery vehicle without confusion.

The autonomous vehicle may be a self-driving transport vehicle that transports the user by autonomous driving, and the place of meeting the user may be where the user is to begin transport in the autonomous vehicle.

An autonomous vehicle that is controlled by a control device having this configuration is a self-driving transport vehicle for transporting a user by autonomous driving and transports a user who gets in the self-driving transport vehicle in a parking lot that is a place of meeting the user. Thus, even when the self-driving transport vehicle is to meet a user in a parking lot where the location information of the self-driving transport vehicle cannot be obtained, the user can identify the self-driving transport vehicle and can get in the self-driving delivery vehicle without confusion. According to another aspect of the present disclosure, the first state may be selected from the plurality of states in accordance with the environment information when the distance from the place of meeting the user to the current location of the user becomes smaller than or equal to the predetermined distance. The autonomous vehicle may be visually distinguished in each of the plurality of states. The autonomous vehicle may be visually distinguished by movement in each of the plurality of states. The autonomous vehicle may be visually distinguished by lights in each of the plurality of states. The second state may be a current state of the autonomous vehicle. When the autonomous vehicle is caused to change from the second state to the first state, the autonomous vehicle may be at the place of meeting the user. The first state may be selected from the plurality of states based on the environment information in accordance with a predetermined priority scheme. The control device may further include a camera, wherein the operations may further include causing the autonomous vehicle to change from the second state to the first state when the user is recognized via the camera.

A control device according to one aspect of the present disclosure is directed to a control device for controlling a state of an autonomous vehicle that is to meet a user. The control device includes: a receiver that receives location information indicating a current location of the user; and a processor. In operation, the processor performs operations including: calculating a distance from a place of meeting the user to the current location of the user, based on the location information; causing, when the distance from the place of meeting the user to the current location of the user becomes smaller than or equal to a predetermined distance, the autonomous vehicle to change from a first state to a second state, the first state and the second state being included in a plurality of states, each of the plurality of states being a state in which the autonomous vehicle is at least one of visually or audibly distinguished; and causing the autonomous vehicle to change from the second state to the first state, when the receiver receives a notification indicating that the user has recognized the autonomous vehicle from a terminal device possessed by the user.

A control device having this configuration receives the location information indicating the current location of a user, calculates the distance from a place of meeting the user to the current location of the user, based on the received location information. When the calculated distance to the user becomes smaller than or equal to a predetermined distance, the control device causes the autonomous vehicle to change from the first state to the second state in which the autonomous vehicle is at least one of visually or audibly distinguished. Accordingly, even when the autonomous vehicle is to meet a user in a parking lot where the location information of the autonomous vehicle cannot be obtained, the current location of the user can be obtained to thereby determine the distance from the parking lot to the user, that is, the distance from the autonomous vehicle to the user, and when the user comes close to the autonomous vehicle, the state of the autonomous vehicle can be changed to a state that is recognizable by the user. As a result, when the autonomous vehicle and a user are to meet, the user can easily identify the autonomous vehicle and can reliably meet up with the autonomous vehicle without confusion.

Also, when a notification indicating that the user has recognized the autonomous vehicle is received from a terminal device possessed by the user, the autonomous vehicle is caused to change from the second state to the first state. Thus, after the user recognizes the autonomous vehicle that he or she is to meet, the state of the autonomous vehicle can be quickly returned to the original state.

The present disclosure can not only be realized as a control device having a characteristic configuration as described above but also be realized as a control method for executing characteristic processing corresponding to the characteristic configuration of the control device. The characteristic processing included in such a control method can also be realized as a computer program to be executed by a computer including a processor, a memory, and so on. Needless to say, such a computer program can be distributed via a non-transitory computer-readable recording medium, such as a compact disc read-only memory (CD-ROM), or a through a communications network, such as the Internet.

Accordingly, other aspects described below also offer advantages that are the same as or similar to those of the above-described control device.

A control method according to another aspect of the present disclosure is directed to a control method for controlling a state of an autonomous vehicle that is to meet a user. The control method includes: receiving location information indicating a current location of the user; sensing a surrounding environment of the autonomous vehicle to obtain environment information; selecting, in accordance with the environment information, a first state from a plurality of states of the autonomous vehicle, each of the plurality of states being a state in which the autonomous vehicle is at least one of visually or audibly distinguished; calculating a distance from a place of meeting the user to the current location of the user, based on the location information; and causing the autonomous vehicle to change from a second state to the first state, when the distance from the place of meeting the user to the current location of the user becomes smaller than or equal to a predetermined distance.

A control method according to yet another aspect in the present disclosure is directed to a control method for controlling a state of an autonomous vehicle that is to meet a user. The control method includes: receiving location information indicating a current location of the user; calculating a distance from a place of meeting the user to the current location of the user, based on the location information; causing, when the distance from the place of meeting the user to the current location of the user becomes smaller than or equal to a predetermined distance, the autonomous vehicle to change from a first state to a second state, the first state and the second state being included in a plurality of states, each of the plurality of states being a state in which the autonomous vehicle is at least one of visually or audibly distinguished; and causing the autonomous vehicle to change from the second state to the first state, when a notification indicating that the user has recognized the autonomous vehicle is received from a terminal device possessed by the user.

The embodiments described below each represent a specific example of the present disclosure. Shapes, constituent elements, steps, the order of steps, and so on described in the embodiments below are examples and are not intended to limit the present disclosure. Of the constituent elements in the embodiments described below, the constituent elements not set forth in the independent claims that represent the broadest concept will be described as optional constituent elements. In all of the embodiments, the contents thereof can be combined. In addition, the present disclosure encompasses various modifications obtained by making changes in a scope conceived by those skilled in the art to each embodiment of the present disclosure, as long as such modifications do not depart from the spirit and scope of the present disclosure.

The embodiments of the present disclosure will be described below with reference to the accompanying drawings.

First Embodiment

FIG. 1 is a block diagram illustrating one example of the configuration of a vehicle-location notifying system in a first embodiment of the present disclosure. The vehicle-location notifying system illustrated in FIG. 1 includes a self-driving delivery vehicle 1 and a user terminal 2. The self-driving delivery vehicle 1 and the user terminal 2 are communicably connected to each other through a predetermined wired or wireless network 3, such as the Internet or a dedicated link. Thus, even when the self-driving delivery vehicle 1 is parked in an indoor parking lot where radio waves from satellites cannot be received, the self-driving delivery vehicle 1 can communicate with the user terminal 2 through the network 3.

The user terminal 2 is implemented by, for example, a smartphone including a processor, a memory, a touch panel, and a communication device. A user who will be a recipient of a package uses the user terminal 2 to receive the package. Specifically, the user terminal 2 selects mode information indicating a mode selected thereby from a plurality of modes as a state in which the self-driving delivery vehicle 1 can be recognized and transmits the mode information to the self-driving delivery vehicle 1. The user terminal 2 also periodically transmits location information indicating the current location of the recipient to the self-driving delivery vehicle 1 through the network 3. The location information may be transmitted at a predetermined timing. The configuration of the user terminal 2 is not particularly limited to the above-described example and may be implemented by another terminal, such as a tablet computer or a portable personal computer.

The self-driving delivery vehicle 1 is an autonomous vehicle that has a plurality of lockers arranged at a predetermined position therein and that delivers recipients' packages placed in the lockers. The self-driving delivery vehicle 1 performs fully autonomous driving (SAE level 5) according to the J3016 definition provided by SAE International (Society of Automotive Engineers, Inc. in USA) and delivers packages in an unmanned state. The fully autonomous driving means performing all dynamic driving tasks based on an autonomous driving system on all roads and under all environment conditions. The package placement configuration in the self-driving delivery vehicle 1 is not particularly limited to the above-described locker configuration, and various changes can be made thereto.

The self-driving delivery vehicle 1 uses, for example, a parking lot as a package delivery place and meets a user in the parking lot. The meeting place may be a place on a road, a privately owned area, or the like other than a parking lot. Also, the parking lot may be any type of parking lot, and may be, for example, a parking lot in which a plurality of parking spaces is clearly sectioned or a parking lot in which parking spaces are not clearly sectioned. The parking lot may also be an indoor parking lot where no global positioning system (GPS) is available and the location information of the self-driving delivery vehicle 1 cannot be obtained.

In the present embodiment, in order to identify the self-driving delivery vehicle 1 that the recipient is to meet, the recipient uses the user terminal 2 to pre-transmit mode information indicating a mode for recognizing the self-driving delivery vehicle 1. The self-driving delivery vehicle 1 receives the mode information from the user terminal 2 through the network 3. Examples of the mode indicated by the mode information include a mode in which a light blinks at predetermined intervals, a mode in which the illumination color of the light changes, a mode in which predetermined sound or music is output, a mode in which the self-driving delivery vehicle 1 automatically moves forward or backward, a mode in which the self-driving delivery vehicle 1 transmits a radio wave and the user terminal 2 detects a change in intensity of the radio wave, a mode in which a door of the self-driving delivery vehicle 1 is opened, a mode in which a door of the self-driving delivery vehicle 1 is opened and closed, a mode in which display on a side-surface display of the self-driving delivery vehicle 1 is changed, a mode in which the self-driving delivery vehicle 1 becomes recognizable by projection mapping, and a mode in which a blinker of the self-driving delivery vehicle 1 enters a blinking state. The mode information may indicate a single method, for example, using only lighting or may indicate a plurality of methods using sound and motion of the self-driving delivery vehicle 1 in addition to lighting.

The self-driving delivery vehicle 1 receives location information indicating the current location of the user terminal 2, the location information being periodically transmitted from the user terminal 2 of the recipient. During parking in a parking lot, when the distance between the location information of the user terminal 2 and the location of the self-driving delivery vehicle 1 becomes smaller than or equal to a certain value, and the current time reaches a time within a predetermined time from a meeting time, the self-driving delivery vehicle 1 executes the mode indicated by the mode information transmitted from the user terminal 2 to notify the recipient about the location of the self-driving delivery vehicle 1. Thus, even at a meeting place, such as an indoor parking lot, where the location information of the self-driving delivery vehicle 1 cannot be obtained, the recipient can reliably meet up with the self-driving delivery vehicle 1 without confusion.

Thereafter, when the recipient successfully identifies the self-driving delivery vehicle 1, the self-driving delivery vehicle 1 stops the mode execution in response to a stop instruction from the recipient. For example, the recipient may press a stop button on the user terminal 2 to transmit the stop instruction to the self-driving delivery vehicle 1, the user terminal 2 and the self-driving delivery vehicle 1 may authenticate each other via near field communication (NFC), or the recipient may press a stop button provided on the self-driving delivery vehicle 1 to thereby make it possible to issue a notification indicating that he or she successfully identified the self-driving delivery vehicle 1.

The self-driving delivery vehicle 1 includes a communicator 11, a notifying-system selector 12, a time manager 13, a light 14, a speaker 15, a travel controller 16, and a radio-wave transmitter 17. The user terminal 2 includes a communicator 21, a display operation unit 22, a mode storage unit 23, a location obtainer 24, and a radio-wave receiver 25. For example, the communicator 11, the notifying-system selector 12, the time manager 13, and the travel controller 16 constitute a control device for controlling the state of the self-driving delivery vehicle 1 that is to meet a user.

The mode storage unit 23 in the user terminal 2 pre-stores therein, for example, four modes including first to fourth modes as states in which the user can recognize the self-driving delivery vehicle 1. In the present embodiment, for example, the first mode is that the light 14 of the self-driving delivery vehicle 1 enters a predetermined turn-on state, the second mode is that the speaker 15 of the self-driving delivery vehicle 1 generates predetermined sound or music, the third mode is that the self-driving delivery vehicle 1 moves forward or backward a predetermined distance, and the fourth mode is that the self-driving delivery vehicle 1 generates a predetermined radio wave that can be received by the user terminal 2. The number of modes and details of the modes are not particularly limited to the above-described example, and one, two, three, five, or more modes may be used, or another state of the self-driving delivery vehicle 1 may be used.

The display operation unit 22 is constituted by a touch panel, a processor, and so on. The display operation unit 22 receives various operation inputs of the recipient and displays various operation screens and so on to the recipient. Specifically, when the recipient operates the display operation unit 22 to input parking-lot information indicating the location of a parking lot, which is to be used as a place of meeting the self-driving delivery vehicle 1, and meeting-time information, which indicates a meeting time, the display operation unit 22 receives the input parking-lot information and the meeting-time information and outputs the parking-lot information and the meeting-time information to the communicator 21.

Also, when the recipient operates the display operation unit 22 to give a request for displaying a mode selection screen, the display operation unit 22 reads the first to fourth modes from the mode storage unit 23 and displays the first to fourth modes in a selectable state. When the recipient selects one of the first to fourth modes, the display operation unit 22 outputs, to the communicator 21, mode information indicating the mode designated by the recipient. The number of modes that are selectable by the recipient is not particularly limited to the above-described example, and when the recipient selects a plurality of modes, the self-driving delivery vehicle 1 may execute the states due to the plurality of modes. The communicator 21 transmits the parking-lot information, the meeting-time information, and the mode information to the self-driving delivery vehicle 1. A method for obtaining the parking-lot information and the meeting-time information is not particularly limited to the above-described example, and various changes can be made thereto. The meeting-time information and the parking-lot information may be transmitted, for example, from a delivery management server for managing package delivery to the self-driving delivery vehicle 1 and the user terminal 2. Also, a cloud server, such as a delivery management server, may include the communicator 11, the notifying-system selector 12, the time manager 13, and so on so as to function as a state control device.

The location obtainer 24 has functions of a GPS. The location obtainer 24 obtains, for example, latitude information and longitude information as the location information indicating the current location of the user terminal 2, that is, the current location of the recipient, and outputs the obtained location information to the communicator 21. After transmitting the mode information, the communicator 21 periodically transmits the location information indicating the current location of the recipient to the self-driving delivery vehicle 1.

The communicator 11 in the self-driving delivery vehicle 1 receives the parking-lot information, the meeting-time information, the mode information, and the location information from the user terminal 2 and outputs the received information to the notifying-system selector 12. The notifying-system selector 12 outputs the meeting-time information to the time manager 13. The time manager 13 has an internal clock or the like and determines whether or not the current time reaches a time within a predetermined time from the meeting time indicated by the meeting-time information. The predetermined time is, for example, five minutes. When the current time reaches a time within the predetermined time from the meeting time, the time manager 13 notifies the notifying-system selector 12 that the current time has reached a time within the predetermined time from the meeting time.

The notifying-system selector 12 outputs the parking-lot information to the travel controller 16. The travel controller 16 controls drive-train components of the self-driving delivery vehicle 1. Examples of the drive-train components include an engine, a steering wheel, an accelerator, a brake, and so on (which are not illustrated) of the self-driving delivery vehicle 1. After causing the self-driving delivery vehicle 1 to travel by autonomous driving to a parking lot indicated by the parking-lot information, the travel controller 16 causes the self-driving delivery vehicle 1 to be parked and wait in the parking lot until the recipient receives a package.

When the self-driving delivery vehicle 1 is parked and waits in the parking lot, the notifying-system selector 12 uses the location information and the parking-lot information to calculate the distance between the user location indicated by the location information and the parking lot location indicated by the parking-lot information, that is, the distance from the self-driving delivery vehicle 1 to the recipient. The notifying-system selector 12 pre-stores therein a predetermined threshold for a mode execution distance at which a predetermined mode is to be executed. The predetermined threshold is, for example, 20 m. The notifying-system selector 12 determines whether or not the distance from the self-driving delivery vehicle 1 to the recipient is smaller than or equal to the predetermined threshold, that is, is smaller than or equal to the mode execution distance. In the case of an indoor parking lot where no GPS is available, the distance from the parking lot to the recipient may be calculated assuming that the location of the self-driving delivery vehicle 1 is equal to the location of the overall parking lot, and a determination may be made as to whether or not the distance is smaller than or equal to the mode execution distance. Also, when the location information of the recipient cannot be obtained, the distance from the self-driving delivery vehicle 1 to the recipient may be calculated using the location information of the recipient which was most recently obtained.

The light 14 includes, for example, a headlight, and the notifying-system selector 12 controls the turn-on state of the light 14. Examples of the turn-on state of the light 14 include the state in which the light 14 blinks at a predetermined cycle and the state in which the light 14 is turned on in predetermined indication color. The light 14 is not particularly limited to the above-described example and may be another light, such as a turn-signal light, a front fog light, or a taillight. The notifying-system selector 12 may be adapted to simultaneously control a plurality of lights.

The speaker 15 includes an external speaker or the like for generating and outputting sound to outside of the self-driving delivery vehicle 1, and the notifying-system selector 12 controls the sound generation state of the speaker 15. The speaker 15 is not particularly limited to the above-described example, and may be implemented by another speaker, such as an internal speaker or the like for generating and outputting sound to inside of the self-driving delivery vehicle 1.

In response to a third-mode execution instruction from the notifying-system selector 12, the travel controller 16 causes the self-driving delivery vehicle 1 to move forward or backward a predetermined distance. The predetermined distance in this case is, for example, 2 to 5 cm. Although moving a vehicle frontward or backward is difficult with manual driving, this mode is made possible by autonomous driving.

In response to a fourth-mode execution instruction from the notifying-system selector 12, the radio-wave transmitter 17 generates a predetermined radio wave, for example, a radio wave according to a Bluetooth (registered trademark) standard. The radio-wave receiver 25 in the user terminal 2 receives the radio wave from the radio-wave transmitter 17 and detects a change in intensity of the received radio wave. When the intensity of the radio wave is larger than or equal to a predetermined value, the radio-wave receiver 25 notifies the display operation unit 22 that the self-driving delivery vehicle 1 is in close proximity to the user terminal 2. The "state being in close proximity" refers to, for example, a state in which the distance between the self-driving delivery vehicle 1 and the user terminal 2 is 3 m or less. Upon receiving a notification indicating that the self-driving delivery vehicle 1 is in close proximity to the user terminal 2, the display operation unit 22 displays a screen indicating that the self-driving delivery vehicle 1 is in close proximity to the user terminal 2 to notify the recipient that the vehicle that is in close proximity to the recipient is the self-driving delivery vehicle 1.

The radio wave detection processing in the radio-wave receiver 25 is not particularly limited to the above-described example, and various changes can be made thereto. For example, the radio-wave receiver 25 may detect the distance between the self-driving delivery vehicle 1 and the user terminal 2, based on the radio-wave intensity, and the display operation unit 22 may display the distance from the user terminal 2 to the self-driving delivery vehicle 1. The radio wave generated by the radio-wave transmitter 17 is not particularly limited to the above-described example, and may be another radio wave, such as a Wi-Fi (registered trademark) radio wave, as long as a change in the radio-wave intensity of the radio-wave receiver 25 is detectable.

When the distance from the self-driving delivery vehicle 1 to the recipient becomes smaller than or equal to the mode execution distance, or the current time reaches a time within a predetermined time from the meeting time, the notifying-system selector 12 causes the state of the self-driving delivery vehicle 1 to change from a first state to a second state. The first state is, for example, a state in which the self-driving delivery vehicle 1 is merely parked. The second state is a state due to the mode indicated by the mode information. A condition for causing the state of the self-driving delivery vehicle 1 to change is not particularly limited to the above-described example, and various changes can be made thereto. For example, when the distance from the self-driving delivery vehicle 1 to the recipient becomes smaller than or equal to the mode execution distance, the state of the self-driving delivery vehicle 1 may be changed from the first state to the second state. Similarly, when the distance from the self-driving delivery vehicle 1 to the recipient becomes smaller than or equal to the mode execution distance, the state of the self-driving delivery vehicle 1 may be changed from the first state to a second state. The second state is a state due to the mode indicated by the mode information designated by the recipient. A constituent element for changing the state in the manner described above is referred to as a "change unit", which includes, for example, at least one of the light 14, the speaker 15, the travel controller 16, and the radio-wave transmitter 17.

Specifically, when the mode information indicates the first mode, the notifying-system selector 12 causes the current state to change from a state in which the light 14 is turned off to a predetermined turn-on state. When the mode information indicates the second mode, the notifying-system selector 12 causes the speaker 15 to generate predetermined sound or music. When the mode information indicates the third mode, the notifying-system selector 12 outputs the third-mode execution instruction to the travel controller 16, and the travel controller 16 causes the self-driving delivery vehicle 1 to move forward or backward a predetermined distance. When the mode information indicates the fourth mode, the notifying-system selector 12 outputs the fourth-mode execution instruction to the radio-wave transmitter 17, and the radio-wave transmitter 17 generates a radio wave that is receivable by the radio-wave receiver 25. In this case, when the intensity of the radio wave received by the radio-wave receiver 25 in the user terminal 2 is larger than or equal to a predetermined value, the display operation unit 22 displays a screen indicating that the self-driving delivery vehicle 1 is in close proximity to the user terminal 2. A method for notifying the user that the self-driving delivery vehicle 1 is in close proximity to the user terminal 2 is not particularly limited to the above-described example and may use, for example, sound or the like.

Since the self-driving delivery vehicle 1 executes the predetermined mode, as described above, the recipient can easily recognize the self-driving delivery vehicle 1 in a parking lot. When the recipient successfully identifies the self-driving delivery vehicle 1, he or she operates the display operation unit 22 of the user terminal 2 to input a mode-execution stop instruction. By using the communicator 21, the display operation unit 22 transmits the mode-execution stop instruction to the self-driving delivery vehicle 1 as a notification indicating that the recipient has recognized the self-driving delivery vehicle 1.

The communicator 11 in the self-driving delivery vehicle 1 receives the mode-execution stop instruction and outputs the mode-execution stop instruction to the notifying-system selector 12. Upon receiving the mode-execution stop instruction, the notifying-system selector 12 determines that the recipient has identified the self-driving delivery vehicle 1, stops the mode execution in accordance with the mode-execution stop instruction from the recipient, and causes the state of the self-driving delivery vehicle 1 to return to the first state.

Figure 2:
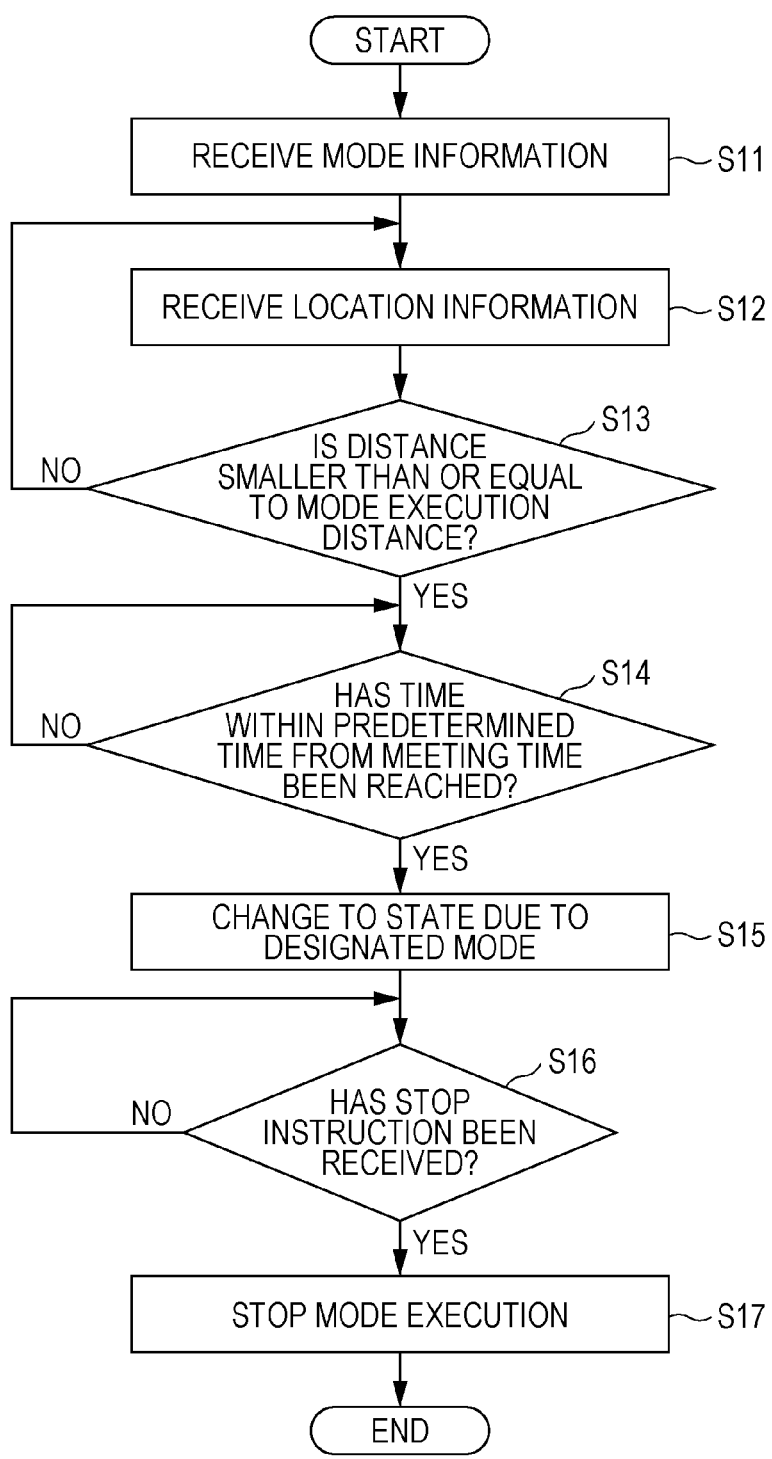
FIG. 2 is a flowchart illustrating one example of state control processing performed by a self-driving delivery vehicle illustrated in FIG. 1.

Next, a description will be given of state control processing performed by the self-driving delivery vehicle 1 configured as described above. FIG. 2 is a flowchart illustrating one example of the state control processing performed by the self-driving delivery vehicle 1 illustrated in FIG. 1.

First, when the mode information indicating a mode designated by a recipient, together with the parking-lot information and the meeting-time information, is transmitted from the communicator 21 in the user terminal 2, the communicator 11 in the self-driving delivery vehicle 1 receives the mode information together with the parking-lot information and the meeting-time information and outputs the received information to the notifying-system selector 12 (step S11). The notifying-system selector 12 then outputs the meeting-time information to the time manager 13 and outputs the parking-lot information to the travel controller 16. The travel controller 16 causes the self-driving delivery vehicle 1 to travel by autonomous driving to a parking lot indicated by the parking-lot information and to be parked and wait in the parking lot until the recipient receives a package.

Next, the communicator 11 receives the location information indicating the current location of the recipient, the location information being periodically transmitted from the user terminal 2, and outputs the location information to the notifying-system selector 12 (step S12).

Next, when the self-driving delivery vehicle 1 is parked and waits in the parking lot, the notifying-system selector 12 uses the location information and the parking-lot information to calculate the distance from the self-driving delivery vehicle 1 to the recipient and determines whether or not the distance from the self-driving delivery vehicle 1 to the recipient is smaller than or equal to the mode execution distance (step S13). If the distance from the self-driving delivery vehicle 1 to the recipient is larger than the mode execution distance (NO in step S13), the process returns to step S12, and then the process in step S13 is performed again. On the other hand, if the distance from the self-driving delivery vehicle 1 to the recipient becomes smaller than or equal to the mode execution distance (YES in step S13), the process proceeds to a process in step S14.

If the distance from the self-driving delivery vehicle 1 to the recipient becomes smaller than or equal to the mode execution distance (YES in step S13), the time manager 13 determines whether or not the current time has reached a time within a predetermined time from the meeting time indicated by the meeting-time information (step S14). If the current time is not within the predetermined time from the meeting time (NO in step S14), the process in steps S14 is continued. On the other hand, if the current time has reached a time within the predetermined time from the meeting time (YES in step S14), the process proceeds to step S15.

If the current time has reached a time within the predetermined time from the meeting time (YES in step S14), the time manager 13 notifies the notifying-system selector 12 that the current time has reached a time within the predetermined time from the meeting time (step S15), and the notifying-system selector 12 causes the state of the self-driving delivery vehicle 1 to change from the current state to a state due to the mode indicated by the mode information.

Specifically, when the mode information indicates the first mode, the notifying-system selector 12 causes the state of the self-driving delivery vehicle 1 to change from the state in which the light 14 is turned off to a predetermined turn-on state. When the mode information indicates the second mode, the notifying-system selector 12 causes the speaker 15 to generate predetermined sound or music. When the mode information indicates the third mode, the notifying-system selector 12 causes the travel controller 16 to move the self-driving delivery vehicle 1 forward or backward a predetermined distance. When the mode information indicates the fourth mode, the notifying-system selector 12 causes the radio-wave transmitter 17 to generate a radio wave that is receivable by the radio-wave receiver 25. Since the self-driving delivery vehicle 1 executes the mode designated by the recipient, as described above, the recipient can easily recognize the self-driving delivery vehicle 1 in the parking lot. In this case, when a user designates any of the modes, it is possible to select the mode corresponding to the user's preference. Thus, it is possible to facilitate meeting between various users and the autonomous vehicle.

After step S15, the notifying-system selector 12 determines whether or not the communicator 11 has received a mode-execution stop instruction (step S16). If the communicator 11 has not received the mode-execution stop instruction (NO in step S16), the process in steps S16 is continued. On the other hand, if the recipient has input the mode-execution stop instruction by using the user terminal 2, and the communicator 11 has received the mode-execution stop instruction (YES in step S16), the process proceeds to step S17.

If the communicator 11 has received the mode-execution stop instruction (YES in step S16), the notifying-system selector 12 determines that the recipient has identified the self-driving delivery vehicle 1, stops the mode execution in accordance with the mode-execution stop instruction from the recipient, and ends the processing (step S17).

In the above-described processing, in the present embodiment, the location information indicating the current location of the recipient is received, the distance from the self-driving delivery vehicle 1 to the recipient is calculated based on the received location information, and when the calculated distance to the recipient becomes smaller than or equal to the mode execution distance, and the current time reaches a time within a predetermined time from the meeting time, the state of the self-driving delivery vehicle 1 is changed from the state in which it is merely parked to a state designated by the recipient. Accordingly, even when the self-driving delivery vehicle 1 is to meet a recipient in a parking lot where the location information of the self-driving delivery vehicle 1 cannot be obtained, the distance from the self-driving delivery vehicle 1 to the recipient can be determined by obtaining the location information of the recipient, and also when the recipient comes close to the self-driving delivery vehicle 1, the state of the self-driving delivery vehicle 1 can be changed to a state designated by the recipient. As a result, when the unmanned self-driving delivery vehicle 1 is to meet the recipient, the recipient can easily identify the unmanned self-driving delivery vehicle 1 and can reliably meet up with the unmanned self-driving delivery vehicle 1 without confusion.

The autonomous driving level of the self-driving delivery vehicle 1 is not particularly limited to the above-described example, and another self-driving vehicle according to a different SAE level may be used. Also, the meeting place may be a place on a road, a privately owned area, or a charging spot, other than a parking lot. The autonomous vehicle disclosed herein is not particularly limited to the above-described self-driving delivery vehicle 1 and may be a self-driving transport vehicle for transporting a user by autonomous driving. In this case, the self-driving transport vehicle meets the user in a parking lot and transports the user who gets in the self-driving delivery vehicle in the parking lot to a place desired by the user. A device having the configuration disclosed herein may be mounted on a vehicle. Also, a program that realizes the configuration disclosed herein may be downloaded to a vehicle. These points also apply to other embodiments described below.

Second Embodiment

Figure 3:
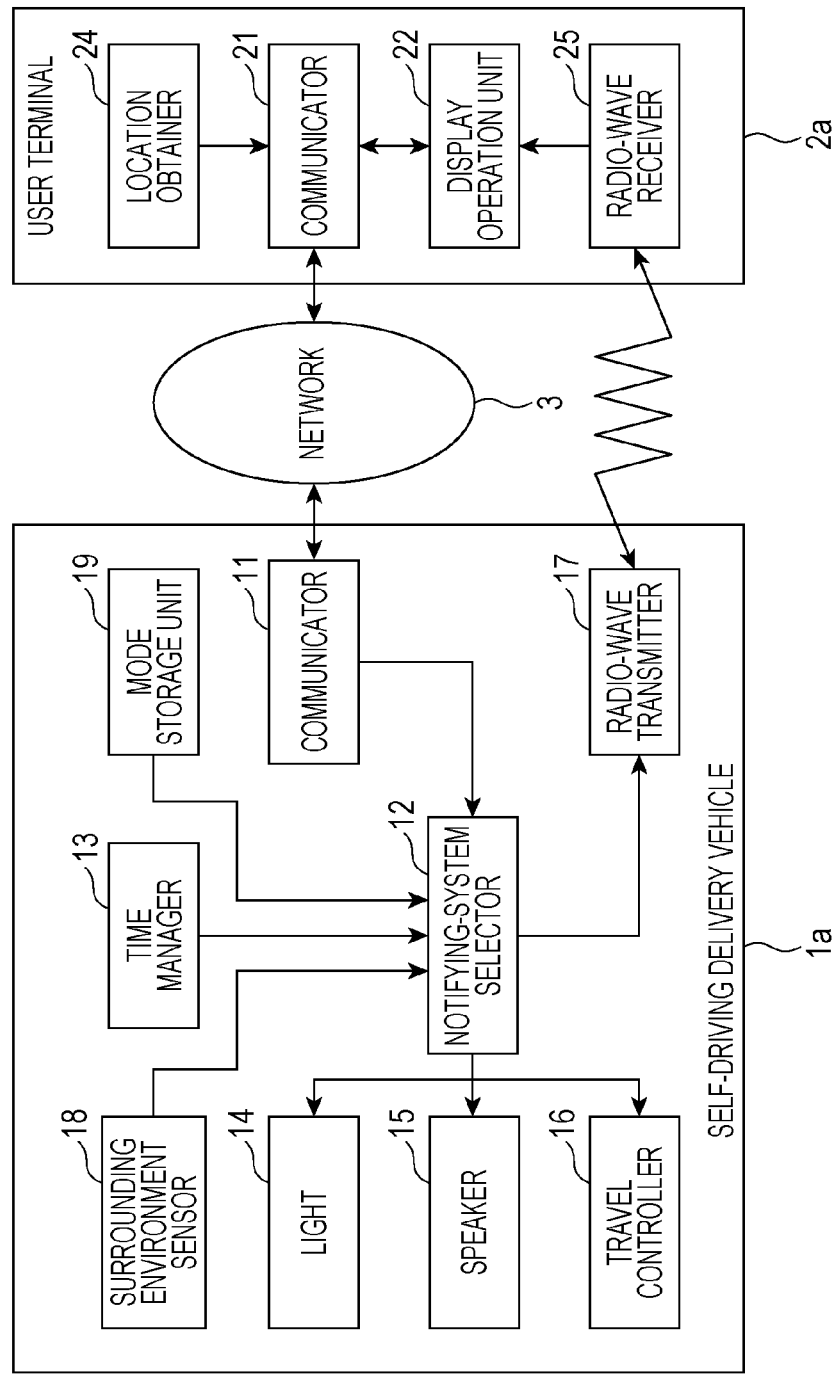
FIG. 3 is a block diagram illustrating one example of the configuration of a vehicle-location notifying system in a second embodiment of the present disclosure.

FIG. 3 is a block diagram illustrating one example of the configuration of a vehicle-location notifying system in a second embodiment of the present disclosure. The vehicle-location notifying system illustrated in FIG. 3 includes a self-driving delivery vehicle 1a and a user terminal 2a. The vehicle-location notifying system illustrated in FIG. 3 differs from the vehicle-location notifying system illustrated in FIG. 1 in that a surrounding environment sensor 18 and a mode storage unit 19 are added to the self-driving delivery vehicle 1a, and the mode storage unit 23 is eliminated from the user terminal 2a. Since other points are substantially the same, the same or similar portions are denoted by the same reference numerals, and detailed descriptions thereof are not given hereinafter. For example, the communicator 11, the notifying-system selector 12, the time manager 13, the travel controller 16, the surrounding environment sensor 18, and the mode storage unit 19 constitute a control device that controls the state of the self-driving delivery vehicle 1a that is to meet a user.

In the present embodiment, without transmitting the mode information from the user terminal 2a, the self-driving delivery vehicle 1a selects a mode that suits the surrounding environment from a plurality of modes and executes the selected mode to thereby notify a recipient about the location of the self-driving delivery vehicle 1a. For example, the self-driving delivery vehicle 1a gives priority to the mode using the light 14 when the surroundings are dark, gives priority to the mode using the speaker 15 when the surroundings are quiet, gives priority to the mode using the travel controller 16 when the surroundings are not congested with vehicles, and gives priority to the mode using the radio-wave transmitter 17 when the surroundings are congested with vehicles in the daytime.

Specifically, the display operation unit 22 in the user terminal 2a receives the parking-lot information and the meeting-time information input by the recipient and outputs the parking-lot information and the meeting-time information to the communicator 21. The location obtainer 24 outputs location information indicating the current location of the user terminal 2a, that is, the current location of the recipient, to the communicator 21, and the communicator 21 periodically transmits the location information indicating the current location of the recipient to the self-driving delivery vehicle 1a.

The communicator 11 in the self-driving delivery vehicle 1a receives the parking-lot information, the meeting-time information, and the location information from the user terminal 2 and outputs the received information to the notifying-system selector 12. The notifying-system selector 12 outputs the meeting-time information to the time manager 13. The time manager 13 determines whether or not the current time has reached a time within a predetermined time from the meeting time indicated by the meeting-time information. When the current time has reached a time within the predetermined time from the meeting time, the time manager 13 notifies the notifying-system selector 12 that the current time has reached a time within the predetermined time from the meeting time.

The notifying-system selector 12 outputs the parking-lot information to the travel controller 16. The travel controller 16 causes the self-driving delivery vehicle 1a to travel by autonomous driving to the parking lot indicated by the parking-lot information and to be parked and wait in the parking lot until the recipient receives a package.

When the self-driving delivery vehicle 1a is parked and waits in the parking lot, the notifying-system selector 12 uses the location information and the parking-lot information to calculate a distance from the self-driving delivery vehicle 1a to the recipient. The notifying-system selector 12 pre-stores a predetermined threshold therein as a mode execution distance for executing a mode selected thereby. The predetermined threshold is, for example, 20 m. The notifying-system selector 12 determines whether or not the distance from the self-driving delivery vehicle 1a to the recipient is smaller than or equal to the mode execution distance.

The surrounding environment sensor 18 senses a surrounding environment of the self-driving delivery vehicle 1a. The surrounding environment sensor 18 includes, for example, an illuminance sensor, a sound collector, and an imaging sensor. The surrounding environment sensor 18 detects brightness of the surroundings of the self-driving delivery vehicle 1a by using the illuminance sensor, detects sound in the surroundings of the self-driving delivery vehicle 1a by using the sound collector, detects a congestion state of other vehicles in the surroundings from an image of the surroundings of the self-driving delivery vehicle 1a photographed by the imaging sensor, and outputs these detection results to the notifying-system selector 12.

The mode storage unit 19 pre-stores four modes including, for example, first to fourth modes, therein as states that can be selected by the self-driving delivery vehicle 1a. In the present embodiment, for example, the first mode is that the light 14 of the self-driving delivery vehicle 1a enters a predetermined turn-on state, the second mode is that the speaker 15 of the self-driving delivery vehicle 1a generates predetermined sound or music, the third mode is that the self-driving delivery vehicle 1a moves forward or backward a predetermined distance, and the fourth mode is that the self-driving delivery vehicle 1a generates a predetermined radio wave that is receivable by the user terminal 2a. The number of modes and details of the modes are not particularly limited to the above-described example, and two, three, five, or more modes may be used, or another state of the self-driving delivery vehicle 1a may be used.

When the distance from the self-driving delivery vehicle 1a to the recipient becomes smaller than or equal to the mode execution distance, and the current time reaches a time within a predetermined time from the meeting time, the notifying-system selector 12 selects one of the first to fourth modes in the mode storage unit 19 in accordance with the detection result of the surrounding environment sensor 18, that is, the surrounding environment, and causes the state of the self-driving delivery vehicle 1a to change from a first state to a second state. The first state is, for example, a state in which the self-driving delivery vehicle 1a is merely parked. The second state in this case is a state due to a mode that suits the surrounding environment.

A condition for causing the state of the self-driving delivery vehicle 1a to change is not particularly limited to the above-described example, and various changes can be made thereto. For example, when the distance from the self-driving delivery vehicle 1a to the recipient becomes smaller than or equal to the mode execution distance, the state of the self-driving delivery vehicle 1a may be changed from the current state to the state due to the mode selected by the notifying-system selector 12. Also, the number of modes selected by the notifying-system selector 12 is not particularly limited to the above-described example, and when the notifying-system selector 12 selects a plurality of modes that suits the surrounding environment, the self-driving delivery vehicle 1a may simultaneously execute the states due to the plurality of modes.

Specifically, when the detection result of the surrounding environment sensor 18 indicates that the brightness of the surroundings is lower than a predetermined brightness, for example, when the detection result indicates that it is early evening or night, the notifying-system selector 12 reads the first mode from the mode storage unit 19 and causes the light 14 to change from a turn-off state to a predetermined turn-on state. When the detection result of the surrounding environment sensor 18 indicates that the sound level in the surroundings is lower than a predetermined sound level, for example, when the detection result indicates that the state of the surroundings is a quiet state in which the sound level is lower than or equal to 50 dB, the notifying-system selector 12 reads the second mode from the mode storage unit 19 and causes the speaker 15 to generate predetermined sound or music, for example, sound whose level is lower than or equal to 60 dB. When the detection result of the surrounding environment sensor 18 indicates that the surroundings are not congested with a predetermined number of other vehicles or more, the notifying-system selector 12 reads the third mode from the mode storage unit 19 and outputs a third-mode execution instruction to the travel controller 16. The predetermined number of vehicles is this case is, for example, three. The travel controller 16 causes the self-driving delivery vehicle 1a to move forward or backward a predetermined distance. When the detection result of the surrounding environment sensor 18 indicates that the brightness of the surroundings is higher than the predetermined brightness, indicates it is daytime, and indicates that the surroundings are congested with a predetermined number of other vehicles or more, the notifying-system selector 12 reads the fourth mode from the mode storage unit 19 and outputs a fourth-mode execution instruction to the radio-wave transmitter 17. The predetermined number of vehicles in this case is, for example, five. The radio-wave transmitter 17 generates a radio wave that can be received by the radio-wave receiver 25. In this case, when the intensity of a radio wave received by the radio-wave receiver 25 in the user terminal 2 is larger than or equal to a predetermined value, the display operation unit 22 displays a screen indicating that the self-driving delivery vehicle 1a is in close proximity to the user terminal 2a.

Depending on the situation of the surroundings, the notifying-system selector 12 may switch among notifiers, such as the light 14, the speaker 15, the travel controller 16, and the radio-wave transmitter 17. That is, depending on the surrounding environment, the notifying-system selector 12 may select, from the above-described plurality of states, a second state in which the notifier differs from that in the above-described second state and may cause the self-driving delivery vehicle 1a to change from the first state to the selected second state. For example, when the surrounding place is a bright place, the mode using the light 14 may be switched to the mode using the speaker 15, and when the surrounding place is a noisy place, the mode using the speaker 15 may be switched to the mode using the light 14.

Specifically, the surrounding environment sensor 18 obtains surrounding environment data by using sensors. The "surrounding environment data" as used herein refers to information on the position of an obstacle, brightness, a noise level, and so on in the surroundings.

Based on the surrounding environment data, the notifying-system selector 12 calculates an effectiveness of each notifier. For example, based on the information of the obstacle position, the notifying-system selector 12 estimates a range (distance information) in which the self-driving delivery vehicle 1a can be seen by the user. Also, based on the information of the brightness, the notifying-system selector 12 calculates a value of difference from the brightness level of the light 14 of the self-driving delivery vehicle 1a. The unit of the value of difference is lux. Also, in accordance with the information of the noise level, the notifying-system selector 12 calculates the value of difference from a sound level that can be generated by the speaker 15 of the self-driving delivery vehicle 1a. The unit of the difference value is dB.

Since the units of numerical values calculated as described above differ from each other, the notifying-system selector 12 converts the calculated numerical values into pre-designed common values indicating ease of recognition by users, compares the degrees of ease of user recognition of information with each other, and selects the notifier with which the information can be easily recognized by users. In this case, a second state in which the notifier differs from that in the above-described second is selected from the above-described plurality of states in accordance with the surrounding environment, and the self-driving delivery vehicle 1a is changed from the first state to the selected second state.

Thus, the state of the self-driving delivery vehicle 1*a* can be switched to a state using the notifier that suits the surrounding situation.

Since the self-driving delivery vehicle 1*a* executes the mode that suits the surrounding environment, the recipient can easily recognize the self-driving delivery vehicle 1*a* in a parking lot. When the recipient successfully identifies the self-driving delivery vehicle 1*a*, he or she operates the display operation unit 22 in the user terminal 2*a* to input a mode-execution stop instruction. By using the communicator 21, the display operation unit 22 transmits the mode-execution stop instruction to the self-driving delivery vehicle 1*a*.

The communicator 11 in the self-driving delivery vehicle 1*a* receives the mode-execution stop instruction and outputs the mode-execution stop instruction to the notifying-system selector 12. Upon receiving the mode-execution stop instruction, the notifying-system selector 12 determines that the recipient has identified the self-driving delivery vehicle 1*a*, stops the mode execution in accordance with the mode-execution stop instruction from the recipient, and causes the state of the self-driving delivery vehicle 1*a* to return to the original state.

Figure 4:
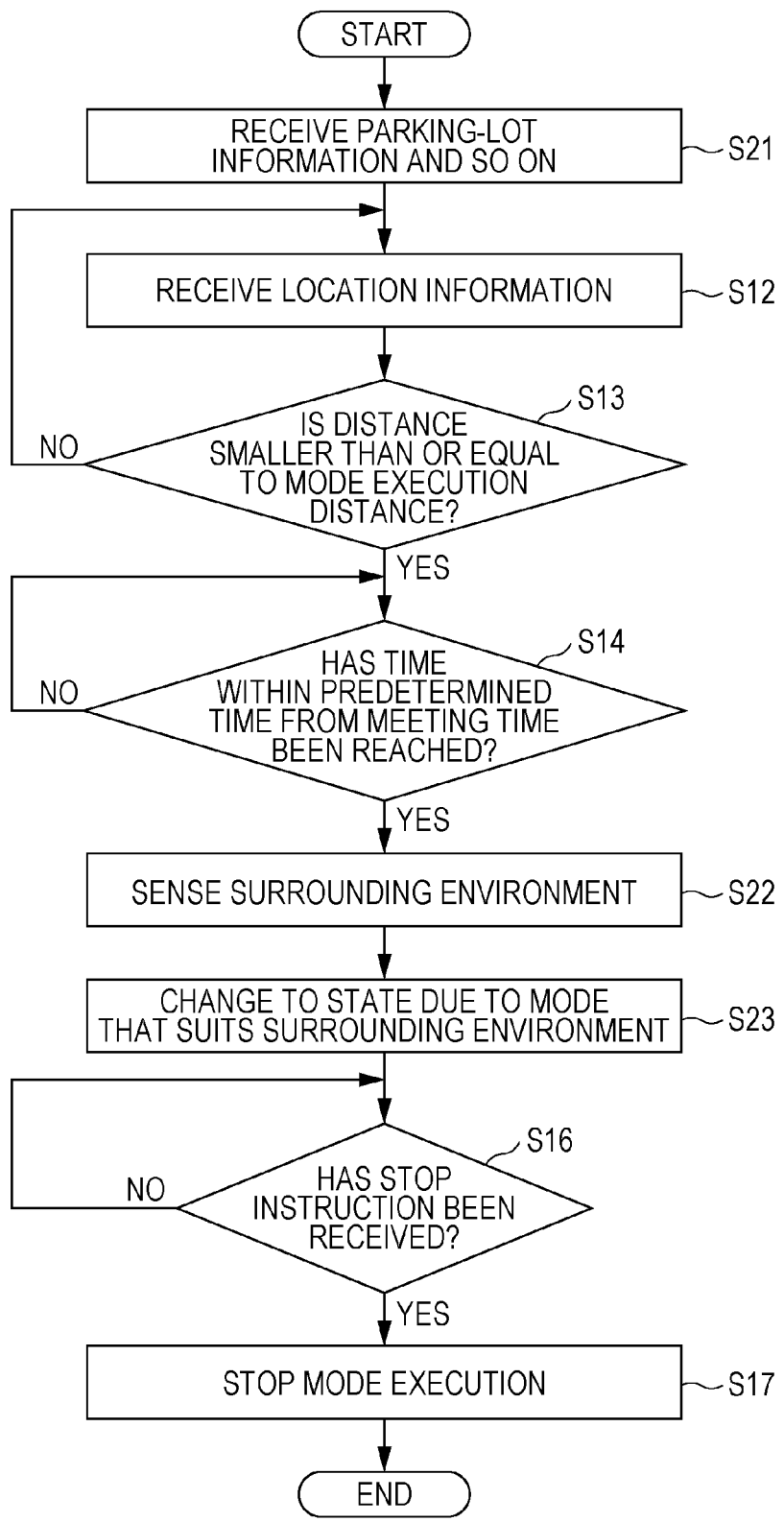
FIG. 4 is a flowchart illustrating one example of state control processing performed by the self-driving delivery vehicle illustrated in FIG. 3.

Next, a description will be given of state control processing performed by the self-driving delivery vehicle 1*a* configured as described above. FIG. 4 is a flowchart illustrating one example of the state control processing performed by the self-driving delivery vehicle 1*a* illustrated in FIG. 3.

First, when the parking-lot information and the meeting-time information are transmitted to the communicator 21 in the user terminal 2*a*, the communicator 11 in the self-driving delivery vehicle 1*a* receives the parking-lot information and the meeting-time information and outputs the received information to the notifying-system selector 12 (step S21). In this case, the notifying-system selector 12 outputs the meeting-time information to the time manager 13 and outputs the parking-lot information to the travel controller 16. The travel controller 16 causes the self-driving delivery vehicle 1*a* to travel by autonomous driving to a parking lot indicated by the parking-lot information and to be parked and wait in the parking lot until the recipient receives a package.

Next, processes that are the same as or similar to those in steps S12 to S14 illustrated in FIG. 2 are executed in steps S12 to S14, and if the current time reaches a time within a predetermined time from the meeting time (YES in step S14), the process proceeds to a process in step S22.

If the current time reaches a time within the predetermined time from the meeting time (YES in step S14), the time manager 13 notifies the notifying-system selector 12 that the current time has reached a time within the predetermined time from the meeting time, the notifying-system selector 12 instructs the surrounding environment sensor 18 to detect the surrounding environment, and the surrounding environment sensor 18 senses the surrounding environment of the self-driving delivery vehicle 1*a* and outputs the detection result to the notifying-system selector 12 (step S22).

Next, in accordance with the detection result of the surrounding environment sensor 18, the notifying-system selector 12 selects one mode from the first to fourth modes in the mode storage unit 19 and causes the state of the self-driving delivery vehicle 1*a* to change from the current state to the state due to the mode that suits the surrounding environment (step S23).

Specifically, when the brightness of the surroundings is lower than a predetermined brightness, the notifying-system selector 12 reads the first mode from the mode storage unit 19 and causes the light 14 to change from a turned-off state to a predetermined turn-on state. When the sound level in the surroundings is lower than a predetermined sound level, the notifying-system selector 12 reads the second mode from the mode storage unit 19 and causes the speaker 15 to generate predetermined sound or music. When the surroundings are not congested with a predetermined number of other vehicles or more, the notifying-system selector 12 reads the third mode from the mode storage unit 19 and causes the travel controller 16 to move the self-driving delivery vehicle 1*a* forward or backward a predetermined distance. When the brightness of the surroundings is higher than the predetermined brightness, and the surroundings are congested with the predetermined number of vehicles or more, the notifying-system selector 12 reads the fourth mode from the mode storage unit 19 and causes the radio-wave transmitter 17 to generate a radio wave that can be received by the radio-wave receiver 25. Since the self-driving delivery vehicle 1*a* executes the mode that can be easily recognized by the recipient in accordance with the surrounding environment, the recipient can easily recognize the self-driving delivery vehicle 1*a* in a parking lot.

Next, processes that are the same as or similar to steps S16 and S17 illustrated in FIG. 2 are executed in steps S16 and S17, and the notifying-system selector 12 stops the mode execution in accordance with a mode-execution stop instruction from the recipient and ends the processing.

In the above-described processing, in the present embodiment, the location information indicating the current location of a recipient is received, and the distance from the self-driving delivery vehicle 1*a* to the recipient is calculated based on the received location information. When the calculated distance to the recipient becomes smaller than or equal to the mode execution distance, and the current time reaches a time within a predetermined time from the time of meeting the recipient, the surrounding environment of the self-driving delivery vehicle 1*a* is detected, the mode that suits the surrounding environment is selected from the first to fourth modes in accordance with the detected surrounding environment, and the state of the self-driving delivery vehicle 1*a* is changed from a merely parked state to a state that suits the surrounding environment. Thus, even when the self-driving delivery vehicle 1*a* is to meet a recipient in a parking lot where the location information of the self-driving delivery vehicle 1*a* cannot be obtained, the current location of the recipient can be obtained to determine the distance from the self-driving delivery vehicle 1*a* to the recipient. Also, when the recipient comes close to the self-driving delivery vehicle 1*a*, the state of the self-driving delivery vehicle 1*a* can be changed to a state that suits the surrounding environment. As a result, when the unmanned self-driving delivery vehicle 1*a* and a recipient are to meet, the recipient can easily identify the unmanned self-driving delivery vehicle 1*a* and can reliably meet up with the self-driving delivery vehicle 1*a* without confusion.

Although, in the present embodiment, the self-driving delivery vehicle 1*a* selects the mode that suits the surrounding environment without transmitting the mode information from the user terminal 2*a*, the present disclosure is not particularly limited thereto, and various changes can be made thereto. For example, a plurality of pieces of mode information indicating a plurality of modes designated by the user may be transmitted from the user terminal 2*a*, and the self-driving delivery vehicle 1*a* may select the mode that suits the surrounding environment from the plurality of modes.

The location obtainer 24 may obtain the location information by using not only a GPS but also a wireless local area network (LAN), visible-light communication, Bluetooth (registered trademark) Low Energy (BLE) iBeacon (registered trademark), ultra-wideband (UWB), Indoor MEssaging System (IMES), an acoustic wave, inertia, or the like.

Third Embodiment

Figure 5:
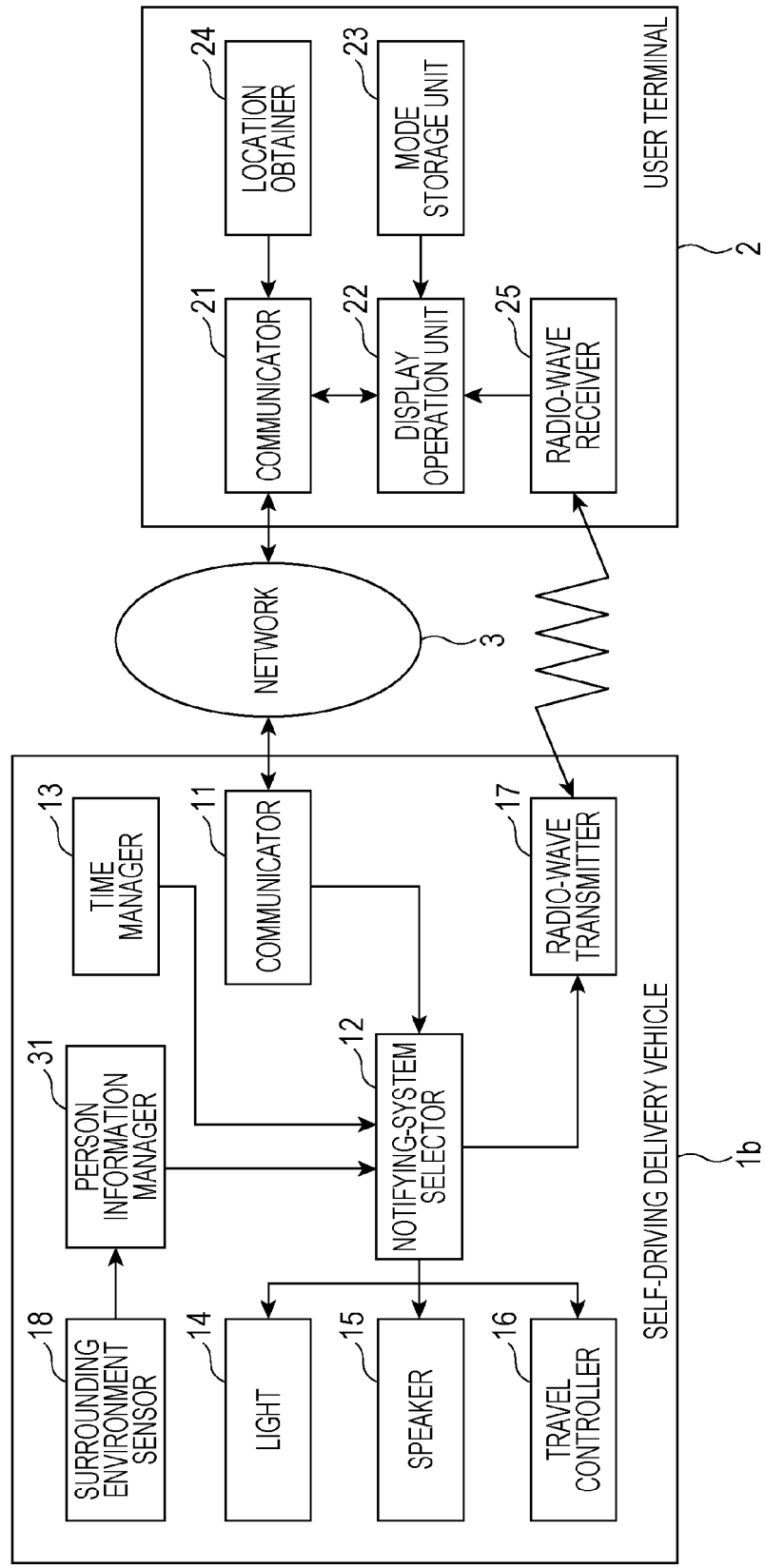
FIG. 5 is a block diagram illustrating one example of the configuration of a vehicle-location notifying system in a third embodiment of the present disclosure.

FIG. 5 is a block diagram illustrating one example of the configuration of a vehicle-location notifying system in a third embodiment of the present disclosure. The vehicle-location notifying system illustrated in FIG. 5 includes a self-driving delivery vehicle 1b and a user terminal 2. The vehicle-location notifying system illustrated in FIG. 5 differs from the vehicle-location notifying system illustrated in FIG. 1 in that the surrounding environment sensor 18 and a person information manager 31 are added to the self-driving delivery vehicle 1b. Since other points are substantially the same, the same or similar portions are denoted by the same reference numerals, and detailed descriptions thereof are not given hereinafter. For example, the communicator 11, the notifying-system selector 12, the time manager 13, the travel controller 16, the surrounding environment sensor 18, and the person information manager 31 constitute a control device for controlling the state of the self-driving delivery vehicle 1b that is to meet a user.

In the present embodiment, the self-driving delivery vehicle 1b detects the user himself/herself, not the user terminal 2, and changes the state of the self-driving delivery vehicle 1b so that it can be perceived by the user. That is, in the present embodiment, based on surrounding person information obtained by the surrounding environment sensor 18 included in the self-driving delivery vehicle 1b, a determination is made as to whether or not the surrounding person information is identical to pre-registered person information. This determination may employ various methods, such as image recognition, recognition using a group of points, and recognition of behavior of searching for a vehicle. When the self-driving delivery vehicle 1b determines that a person in question is an identical person, a notification indicating the vehicle location of the self-driving delivery vehicle 1b is physically issued to the user, based on the notification method disclosed thus far.

Specifically, the surrounding environment sensor 18 includes a laser sensor, a camera, and so on and obtains surrounding person information indicating a person who is present in the surroundings of the self-driving delivery vehicle 1b. The person information manager 31 manages person information and determines whether or not the surrounding person information and pre-registered person information match each other. When the person information manager 31 determines that the surrounding person information and the pre-registered person information match each other, the notifying-system selector 12 causes the self-driving delivery vehicle 1b to change from the first state to a second state. The second state is a state in which the user can recognize the self-driving delivery vehicle 1b.

Next, a description will be given of state control processing performed by the self-driving delivery vehicle 1b configured as described above. FIG. 6 is a flowchart illustrating one example of the state control processing performed by the self-driving delivery vehicle 1b illustrated in FIG. 5.

First, in step S11, a process that is the same as or similar to the process in step S11 illustrated in FIG. 2 is executed, and then the surrounding environment sensor 18 obtains surrounding person information indicating a person who is present in the surroundings of the self-driving delivery vehicle 1b (step S31).

Next, the person information manager 31 determines whether or not the surrounding person information obtained by the surrounding environment sensor 18 and the pre-registered person information match each other (step S32). If the surrounding person information and the pre-registered person information do not match each other (NO in step S32), the process returns to step S31, and then the process in step S32 is performed again.

On the other hand, if the surrounding person information and the pre-registered person information match each other (YES in step S32), the process proceeds to step S14. In steps S14 to S17, processes that are the same as or similar to the processes in step S14 to step S17 illustrated in FIG. 2 are executed, and the notifying-system selector 12 stops the mode execution in accordance with a mode-execution stop instruction from the recipient and ends the processing.

In the above-described processing, in the present embodiment, the surrounding person information is obtained, and a determination is made as to whether or not the obtained surrounding person information and the pre-registered person information match each other. When it is determined that the surrounding person information and the pre-registered person information match each other, the self-driving delivery vehicle 1b is changed from the first state to the second state. Thus, when the user is a pre-registered person, the user can easily identify the self-driving delivery vehicle 1b and can reliably meet up with the self-driving delivery vehicle 1b without confusion.

In the control device and the control method according to the present disclosure, when an autonomous vehicle and a user are to meet, the user can easily identify the autonomous vehicle and can reliably meet up with the autonomous vehicle without confusion. Thus, the control device and the control method are useful as a control device and a control method for controlling the state of the autonomous vehicle that is to meet the user.

What is claimed is:

1. A control device for controlling a state of an autonomous vehicle that is to meet a user, the control device comprising:
　　a receiver that receives first location information indicating a current location of the user;
　　a memory that stores a plurality of states of the autonomous vehicle, each of the plurality of states being a state in which the autonomous vehicle is at least one of visually or audibly distinguished;
　　a sensor that senses a surrounding environment of the autonomous vehicle to obtain environment information; and
　　a processor that, in operation, performs operations including:
　　　　obtaining second location information indicating a place of meeting the user, the control device not being able to obtain third location information from the autonomous vehicle indicating a current location of the autonomous vehicle in response to the autonomous vehicle being at a location where signals from satellites cannot be received;
　　　　calculating a distance from the place of meeting the user to the current location of the user, based on the first location information and the second location information,
　　　　selecting a first state from the plurality of states in accordance with the environment information, and causing the autonomous vehicle to change from a second state to the first state when the distance from the place of meeting the user to the current location of the user becomes smaller than or equal to a predetermined distance.

2. The control device according to claim 1,
wherein the operations further include
  determining that a current time is within a predetermined time from a time of meeting the user, and
  causing the autonomous vehicle to change from the second state to the first state when the distance from the place of meeting the user to the current location of the user becomes smaller than or equal to the predetermined distance and the current time is within the predetermined time from the time of meeting the user.

3. The control device according to claim 1,
wherein the operations further include:
  receiving, via the receiver, the first state designated by the user.

4. The control device according to claim 1,
wherein the plurality of states includes at least one of a state in which a light of the autonomous vehicle enters a predetermined turn-on state, a state in which the autonomous vehicle generates a predetermined sound, a state in which the autonomous vehicle moves forward or backward a predetermined distance, a state in which the autonomous vehicle generates a predetermined radio wave that is receivable by a terminal device possessed by the user, a state in which a door of the autonomous vehicle is opened and closed, a state in which a display on a side-surface display of the autonomous vehicle is changed, a state in which the autonomous vehicle is visually distinguished with projection mapping, and a state in which a blinker of the autonomous vehicle enters a blinking state.

5. The control device according to claim 1,
wherein, amongst the plurality of states, notifiers for making the autonomous vehicle at least one of visually or audibly distinguished to the user differ.

6. The control device according to claim 1,
wherein the environment information includes surrounding person information regarding a person who is in the surrounding environment of the autonomous vehicle; and
wherein the operations further include:
  determining whether the surrounding person information and pre-registered person information match, and
  causing the autonomous vehicle to change from the second state to the first state, when it is determined that the surrounding person information and the pre-registered person information match.

7. The control device according to claim 1,
wherein the autonomous vehicle is a self-driving delivery vehicle that delivers a package to the user by autonomous driving, and
the place of meeting the user is a parking lot where the package is delivered to the user.

8. The control device according to claim 1,
wherein the autonomous vehicle is a self-driving transport vehicle that transports the user by autonomous driving, and
the place of meeting the user is where the user is to begin transport in the autonomous vehicle.

9. The control device according to claim 1,
wherein the first state is selected from the plurality of states in accordance with the environment information when the distance from the place of meeting the user to the current location of the user becomes smaller than or equal to the predetermined distance.

10. The control device according to claim 1,
wherein the autonomous vehicle is visually distinguished in each of the plurality of states.

11. The control device according to claim 10,
wherein the autonomous vehicle is visually distinguished by movement in each of the plurality of states.

12. The control device according to claim 10,
wherein the autonomous vehicle is visually distinguished by lights in each of the plurality of states.

13. The control device according to claim 1,
wherein the second state is a current state of the autonomous vehicle.

14. The control device according to claim 1,
wherein the first state is selected from the plurality of states based on the predetermined distance and the environment information.

15. The control device according to claim 1,
wherein the first state is selected from the plurality of states based on the environment information in accordance with a predetermined priority scheme.

16. The control device according to claim 1, further comprising:
  a camera,
  wherein the operations further include:
    causing the autonomous vehicle to change from the second state to the first state when the user is recognized via the camera.

17. A control device for controlling a state of an autonomous vehicle that is to meet a user, the control device comprising:
  a receiver that receives location information indicating a current location of the user; and
  a processor that, in operation, performs operations including:
    calculating a distance from a place of meeting the user to the current location of the user, based on the location information;
    causing, when the distance from the place of meeting the user to the current location of the user becomes smaller than or equal to a predetermined distance, the autonomous vehicle to change from a first state to a second state, the first state and the second state being included in a plurality of states, each of the plurality of states being a state in which the autonomous vehicle is at least one of visually or audibly distinguished, the first state including the autonomous vehicle being parked, the second state including the autonomous vehicle being at least one of visually or audibly distinguished from the first state in which the autonomous vehicle is parked; and
    causing the autonomous vehicle to change from the second state to the first state in which the autonomous vehicle is parked, when the receiver receives a notification indicating that the user has at least one of visually or audibly distinguished the autonomous vehicle from a terminal device possessed by the user.

18. A control method for controlling a state of an autonomous vehicle that is to meet a user, the control method comprising:
  receiving first location information indicating a current location of the user;

obtaining second location information indicating a place of meeting the user, third location information from the autonomous vehicle indicating a current location of the autonomous vehicle not being able to be obtained in response to the autonomous vehicle being at a location where signals from satellites cannot be received;

sensing a surrounding environment of the autonomous vehicle to obtain environment information;

selecting, in accordance with the environment information, a first state from a plurality of states of the autonomous vehicle, each of the plurality of states being a state in which the autonomous vehicle is at least one of visually or audibly distinguished;

calculating a distance from the place of meeting the user to the current location of the user, based on the first location information and the second location information; and causing the autonomous vehicle to change from a second state to the first state when the distance from the place of meeting the user to the current location of the user becomes smaller than or equal to a predetermined distance.

19. A control method for controlling a state of an autonomous vehicle that is to meet a user, the control method comprising:

receiving location information indicating a current location of the user;

calculating a distance from a place of meeting the user to the current location of the user, based on the location information;

causing, when the distance from the place of meeting the user to the current location of the user becomes smaller than or equal to a predetermined distance, the autonomous vehicle to change from a first state to a second state, the first state and the second state being included in a plurality of states, each of the plurality of states being a state in which the autonomous vehicle is at least one of visually or audibly distinguished, the first state including the autonomous vehicle being parked, the second state including the autonomous vehicle being at least one of visually or audibly distinguished from the first state in which the autonomous vehicle is parked; and causing the autonomous vehicle to change from the second state to the first state in which the autonomous vehicle is parked, when a notification indicating that the user has at least one of visually or audibly distinguished the autonomous vehicle is received from a terminal device possessed by the user.

20. The control device according to claim 1, wherein the operations further include:

causing the autonomous vehicle to change from the second state to the first state, when the receiver receives a notification indicating that the user has recognized the autonomous vehicle from a terminal device possessed by the user.

21. The control method according to claim 18, further comprising:

causing the autonomous vehicle to change from the second state to the first state, when the receiver receives a notification indicating that the user has recognized the autonomous vehicle from a terminal device possessed by the user.

* * * * *